United States Patent [19]
Ward

[11] 3,727,881
[45] Apr. 17, 1973

[54] FLUID CONTROL SWITCHING ARRANGEMENTS

[75] Inventor: Edward John Ward, Haywards Heath, England

[73] Assignee: Norcon (Norris) Limited, Heath, England

[22] Filed: Mar. 29, 1971

[21] Appl. No.: 128,985

[30] Foreign Application Priority Data

Dec. 12, 1970 Great Britain.................59,173/70

[52] U.S. Cl..................................251/129, 251/322
[51] Int. Cl. ........................F16k 1/14, F16k 31/02
[58] Field of Search...................251/322, 323, 61.4, 251/63.6

[56] References Cited

UNITED STATES PATENTS

| | | | |
|---|---|---|---|
| 1,088,822 | 3/1914 | Kenney | 251/322 X |
| 1,857,363 | 5/1932 | Dencklan | 251/322 X |
| 3,098,501 | 7/1963 | McLeod | 251/322 X |
| 3,188,047 | 6/1965 | Criffield | 137/625.64 X |
| 3,478,774 | 11/1969 | Noakes et al. | 251/61.4 X |

FOREIGN PATENTS OR APPLICATIONS

| | | | |
|---|---|---|---|
| 516,984 | 2/1953 | Belgium | 251/63.6 |
| 521,863 | 8/1953 | Belgium | 251/63.6 |
| 1,064,705 | 9/1959 | Germany | 251/61.4 |

Primary Examiner—Arnold Rosenthal
Attorney—Melvin A. Crosby

[57] ABSTRACT

A fluid control switching arrangement having a control valve employing a needle slideable in a bore to close an outlet, wherein the friction losses introduced by a sealing ring are reduced by providing the sealing ring at a relatively thin central portion of the needle, between relatively thick end portions. The control valve may be pressure operated by a diaphragm or bellows, or may be operated by a electro-mechanical transducer.

7 Claims, 1 Drawing Figure

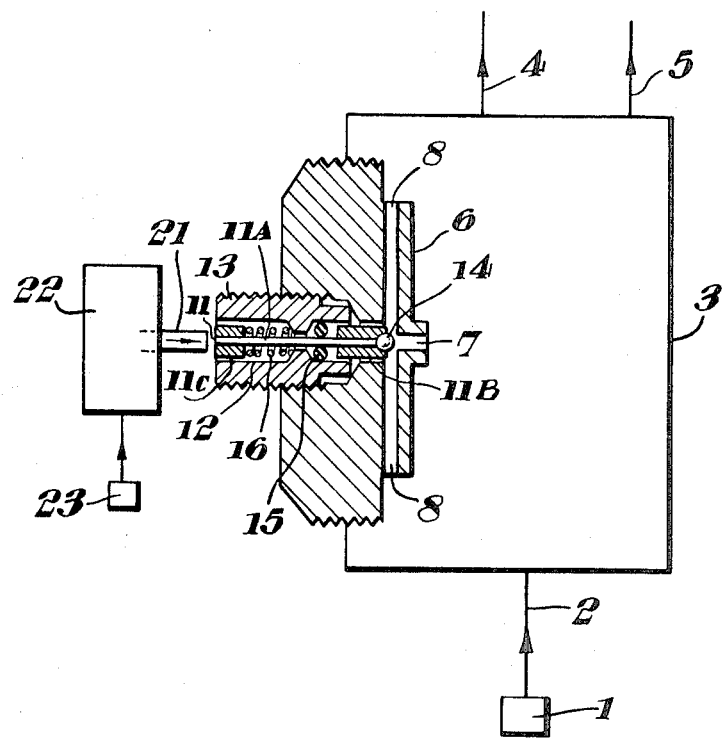
INVENTOR:
EDWARD JOHN WARD

FLUID CONTROL SWITCHING ARRANGEMENTS

The invention relates to fluid control switching devices of the type employed for controlling the flow of a fluid under pressure in a pneumatic or hydraulic system.

In many fields of use the need arises for a step-up relay at the interface between a low pressure control system and a high pressure operating system, or for effecting control of a high pressure system by a relatively very low pressure source, which may itself be pneumatically, hydraulically, mechanically, or electrically operable.

A suitable step-up relay can be formed by the use of a spool valve controlling the high-pressure system, the spool member being slidable within a chamber and positioned to direct fluid flow in a required manner, if a restricted flow-path is provided from the high-pressure inlet to one end of the chamber, where a control valve is provided, which can be closed to cause a build-up of pressure at that end of the chamber, and so cause the spool to move. In the case of a single-ended arrangement a return spring will be provided to urge the spool member towards that end of the chamber at which the control valve is provided.

Such devices are described and claimed in our United Kingdom Pat. specification No. 1,181,243 and U.S. specification Pat. No. 3,474,828, for example, both of which employ the output of a fluidic logic element to operate the control valve, which may take the form of a needle or ball valve having a seating at an aperture in an end-wall of the main valve chamber. Electrical or mechanical force can be employed to operate the needle, in place of a bellows or diaphragm suitable for use where fluid control pressure sources are employed.

In all such constructions, the actual operating force required to operate the needle valve may be very small relative to the pressure in the high-pressure system, but it is essential that the operating means are effectively shielded from the high-pressure fluid, and this leads to the need for sealing arrangements, which introduce friction losses, and in the constructions used here-to-fore, it has not been possible to obtain any further reduction in the operating force required.

One object of the present invention is to provide a control valve arrangement which can be used to reduce the frictional losses involved in the sealing arrangements of such step-up relays, and so further reduce the operating force that is required.

The invention consists in a control valve arrangement for a fluid control switching device, in which a valve needle is slideably mounted in a bore in such a manner that it can engage a valve seating in an orifice plate and so close an outlet for high-pressure fluid, said needle comprising a relatively thick valve-closure portion, a relatively thin central portion, and a relatively thick thrust-receiving end portion, and at least one sealing ring being provided within said bore and surrounding said relatively thin central portion.

The invention will now be described with reference to the drawing, which is a schematic representation of a fluid control switching device including a cross-sectional view of an exemplary embodiment of a control valve arrangement in accordance with the invention.

In the drawing a high-pressure source 1 is connected via an inlet port 2 to a spool valve 3 which has two output ports 4 and 5 that are selectively connectable to the inlet 2 by movement of a spool valve member (not shown). The spool valve member is slideable within a chamber which is terminated at one end by an orifice plate 6 that forms part of a control valve arrangement. A restricted passage is provided to enable the high-pressure fluid to pass from the inlet port 2 to that end of the chamber terminated by the orifice plate 6. A central aperture 7 in this orifice plate communicates with exhaust passages 8 when the control valve is open, so that there can be no build-up in the pressure at that end of the chamber. A valve operating member 11 is positioned within a bore 12 of an extension piece 13 which is screwed into the orifice plate 8, and can be moved to shut the control valve by bringing a ball 14 to engage a valve seating formed by the aperture 7. In this embodiment the operating member 11 has a central shaft portion 11a having a diameter of 0.03" and the ball 14 is mounted thereon in a relatively thick end portion formed by a sleeve 11B secured to the shaft 11A. At the opposite end of the shaft 11A a relatively thick thrust-receiving portion is provided by a nylon sleeve 11C secured to that end of the shaft 11A. Obviously, the operating member portions can be integrally formed, or constructed in various ways, but sealing to prevent the access of high-pressure fluid is prevented by an O-ring 15 which surrounds the relatively thin central shaft portion 11A, while leaving the latter free to slide therein. A light return spring 16 is provided to urge the needle valve into the open position. The bore 12 has a central inwardly extending flange which serves as a seating for the spring 16, and the O-ring 15, and will also prevent excessive flexing of the needle-like central shaft portion 11A when operating pressure is applied by a thrust member 21, forming part of an actuator element 22, which is schematically illustrated, together with its control signal source 23.

The actuator element 22 may be a diaphragm or bellows if the switching device is to be operated by fluid pressure, such as the output of a control signal source 23 in the form of a fluidic logic device.

Alternatively, the actuator element 22 may be a solenoid, a moving-coil, or other type of electro-mechanical transducer, in which case the provision of the control valve constructed in accordance with the invention will enable very low operating currents to be employed, while ensuring reliable operation. The main valve 3 and the actuator 22 have been shown schematically to emphasize that the control valve can be used with various main valve and actuator combinations. The earlier known constructions have used a needle having substantially constant thickness, in the order of 0.1 inch, and it has surprisingly been found that the friction produced by the provision of O-rings of suitable size on such a needle has prevented the achievement of really low operating forces. The construction shown has been used to provide effective control of fluid pressure systems operating at 3,000 p.s.i. by an actuator thrust in the order of one-half lb.

The arrangement still shows considerable advantage when used to control a pneumatic system operating at 80 p.s.i.

What I claim as my invention and desired to secure by letters patent of the United States is:

1. In a control valve, especially for fluid switching operations; a member having an orifice therein support means having a bore therein coaxial with said orifice, a thin elongated valve member on the axis of said bore and having radial clearance from the bore at all points along the valve member, closure means on the end of the valve member nearest said orifice adapted to engage and close said orifice when the valve member is moved toward the orifice, a spring in said bore biasing said valve member axially away from said orifice, said support means comprising a flange in said bore engaging one end of the spring and said valve member comprising means engaging the other end of the spring, the end of said valve member remote frog said orifice being adapted to receive axial thrust to move the valve member toward orifice closing position, said valve member having a cylindrical region between the ends thereof, said bore having a cylindrical region in the axial range of the cylindrical region of said valve members and substantially larger in diameter than the cylindrical region of said valve member, and a resilient rubber-like "O" ring surrounding said cylindrical region of said valve member and engaging both of the said cylindrical regions and forming the sole radial support of said valve member throughout the entire length of the valve member.

2. A control valve according to claim 1 in which said closure means includes a sleeve fixed to the end of said valve member nearest said orifice whereby the portion of said valve member nearest said orifice is substantially larger in diameter than said cylindrical region thereof.

3. A control valve according to claim 1 in which said closure means on the end of the valve member nearest said orifice is in the form of a ball.

4. A control valve according to claim 1 which includes a sleeve element fixed to said valve member on the end of the valve member which is remote from said orifice, said sleeve element forming the means engaging the other end of the valve member which is remote from said orifice, said sleeve element forming the means engaging the other end of said spring.

5. A control valve according to claim 4 in which said sleeve element is nylon.

6. A control valve according to claim 1 which includes actuator means adjacent the end of the valve member which is remote from said orifice adapted to exert an axial thrust on the valve member.

7. A control valve according to claim 6 in which said actuator means is an electro-mechanical actuator.

* * * * *